(12) United States Patent
Speas et al.

(10) Patent No.: US 6,275,152 B1
(45) Date of Patent: *Aug. 14, 2001

(54) ITEM SELECTION AND ITEM LOADING ERROR PROOFING APPARATUS

(75) Inventors: Gary Speas, Little Rock; Kevin Hodges; Dennis Staggs, both of Russellville, all of AR (US)

(73) Assignee: Speastech, Inc., Little Rock, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/052,216

(22) Filed: Mar. 31, 1998

Related U.S. Application Data (63) Continuation of application No. 08/631,032, filed on Apr. 12, 1996, now Pat. No. 5,805,451.

(51) Int. Cl.[7] .................................................. G08B 13/18
(52) U.S. Cl. ........................... 340/556; 340/555; 700/213
(58) Field of Search .................................. 340/540, 555, 340/556, 557, 568.1, 572.4; 700/110, 213, 214, 217; 361/191, 154, 160

(56) References Cited

U.S. PATENT DOCUMENTS

| | | | |
|---|---|---|---|
| 2,796,658 | 6/1957 | Aller | 29/898.062 |
| 2,823,820 | 2/1958 | Merchant | 29/707 |
| 3,216,101 | 11/1965 | Miller | 29/407.04 |
| 3,222,597 | 12/1965 | Beatenbough et al. | 324/555 |
| 3,704,396 | 11/1972 | Macdonald | 361/175 |
| 3,908,800 | 9/1975 | Drapeau | 186/56 |
| 4,139,977 | 2/1979 | Russell | 53/77 |
| 4,181,948 | 1/1980 | Jackson et al. | 700/223 |
| 4,213,286 | 7/1980 | Ragard | 53/493 |
| 4,346,453 | 8/1982 | Drapeau et al. | 705/28 |
| 4,419,734 | 12/1983 | Wolfson et al. | 702/129 |
| 4,574,692 | 3/1986 | Wahli | 101/2 |
| 4,674,594 | 6/1987 | Jensen | 181/243 |
| 4,821,197 | 4/1989 | Kenik et al. | 700/106 |
| 4,850,783 | 7/1989 | Maekawa | 414/792.9 |
| 4,998,206 | 3/1991 | Jones et al. | 700/96 |
| 5,029,095 | 7/1991 | Kenik et al. | 700/106 |
| 5,201,429 | 4/1993 | Hikosaka et al. | 211/59.2 |
| 5,215,213 | 6/1993 | Nestler et al. | 221/129 |
| 5,218,196 | * 6/1993 | Dogul et al. | 340/556 |
| 5,238,349 | 8/1993 | Grace, Sr. | 414/269 |
| 5,249,131 | 9/1993 | Kato | 700/217 |
| 5,414,634 | * 5/1995 | Morgan et al. | 700/214 |
| 5,559,664 | * 9/1996 | Dogul et al. | 361/191 |
| 5,577,733 | * 11/1996 | Downing | 273/348 |
| 5,805,451 | * 9/1998 | Speas et al. | 700/110 |

* cited by examiner

*Primary Examiner*—Van T. Trieu
(74) *Attorney, Agent, or Firm*—Senniger, Powers, Leavitt & Roedel

(57) ABSTRACT

Apparatus for error proofing in manufacturing and kitting operations and the like. A frame having two or four frame members utilizes light emitters and sensors on opposite sides to determine when the plane of the frame has been broken, and storage areas behind the frame have been accessed. This information is compared to programmed information to verify whether errors in accessing the storage area have occurred. The plane of the frame has a plurality of penetration zones distinguishable by their respective corresponding emitter and sensor pairs.

9 Claims, 7 Drawing Sheets

ITEM SELECTION AND ITEM LOADING ERROR PROOFING APPARATUS

This application is a continuation of application, Ser. No. 08/631,032, filed Apr. 12, 1996 now U.S. Pat. No. 5,805,451.

BACKGROUND OF THE INVENTION

The present invention relates to systems for error proofing in order picking operations, inventory control systems and, more particularly, to controlling the completeness and optionally the sequence of selection or placement of items on a repetitive basis.

Particularly in the consumer goods market, but also in other areas of commerce, it is common for a manufacturer to be required to package and ship groups of parts for use in the subsequent assembly of an article by the consumer. For example, large toys and bicycles are often sold partially assembled and are packaged with the appropriate number and kind of fasteners and parts to allow complete assembly by the purchaser. If, however, the wrong types or numbers of fasteners and smaller parts are supplied or some parts are missing, the purchaser is delayed in his or her assembly and must either return the purchased article or request that the additional parts be supplied. This incomplete or erroneous packaging thus causes loss of consumer satisfaction with the purchase and ultimately loss of confidence in the ability of the manufacturer to supply a complete package for assembly.

Similarly, in the assembly of products by a manufacturer, a certain number and variety of component parts must be selected A particular product can be improperly assembled if this number and variety of parts are improperly or erroneously packaged.

In the past, the difficulty for the manufacturer has been the human error in the manual repetitive selection of items to form the desired group of items. In such a selection process it is common to provide a plurality of bins or shelves or other locations each of which holds a plurality of one of the parts to be selected. These may be adjacent one another so as to allow the worker or workers to select the desired parts or items to form the desired group. On the other hand, the bins, shelves or the like from which workers must select parts for a single assembly operation may be remote from each other within a manufacturing plant. In either case, no matter how careful the workers are, it is common to have an occasional error in the selection process and the number of errors depends on the skill and care of each worker. Therefore, it is usually necessary to constantly check the groups selected by the workers to ensure that the selection process is being carried out correctly and completely. The quality control process usually involves the random checking of selected groups of items to see if they are complete. However, even this checking results in some missed groups of improperly selected items which eventually get to the consumer.

In addition to random checking, it is known to provide a system for the repetitive selection of items where means are provided for sensing when each item of a desired group of items has been selected and whether the complete group of items has been selected in the proper sequence. This eliminates any error in the selection of items for the particular group of items intended to be selected. However, this system is "hard wired" and is designed for a specific selection sequence. Therefore, it is necessary to rewire or build a completely new system if the selection sequence is changed in any way. Thus, such a system is inconvenient to adapt to multiple uses and must be built for a specific group of items to be selected.

In loading storage racks and the like with inventory it is important that the proper components be loaded into the proper rack and that the proper number of components be so loaded. For inventory tracking and security purposes it is also important to monitor the number of components.

There are also operations in which it is important to ensure that all items used in a particular process are returned to a storage place therefor after the process is completed. For example, if a certain number of surgical instruments or gauzes are used in a surgical operation, it is important to ensure that all such instruments or gauzes are returned to a storage location after the operation is complete, or at least before a patient is closed. Without proper inventory control procedures there is a risk that one or more of the instruments used in the operation has been left inside the patient.

Morgan et al. U.S. Pat. No. 5,414,634, Hikosaka et al. U.S. Pat. No. 5,201,429, Kenik et al. U.S. Pat. No. 4,821,197, and Drapeau U.S. Pat. No. 3,908,800 each disclose an error proofing device or inventory control mechanism utilizing a rigid frame structure physically defining several openings which correspond to sources of items to be selected. Limitations of these devices are that the size and position of the respective openings are not adjustable and that they are not readily adaptable for use in connection with a variety of existing storage rack system.

SUMMARY OF THE INVENTION

The present invention overcomes the difficulties and disadvantages associated with the prior art systems and methods by providing a system and method for the repetitive selection of a group of items which utilizes a series of sensors associated with supplies of items so that the manual selection of an item or items from a supply can be monitored, and provides means for allowing the system to be "taught" so that it can easily be used for the repetitive selection of many different desired groups of items without the necessity of rewiring or constructing a totally new device. Furthermore, the apparatus includes selection zones defined by a single axis or dual axis light and sensor grid rather than by physical frame components. As such, it is readily applicable to an existing storage rack system or the like and is adjustable from one application to the next.

Briefly, therefore, the invention is directed to an apparatus for sensing completeness of a human operator's selection of components from sources of components or return of components to sources or loading of inventory into storage areas in a manufacturing, assembly or like operation. There is a frame defining a plane for placement between the operator and the sources of the components such that the operator must break the plane to access the sources. The has an exterior defined by a first x-axis frame member and a second x-axis frame member spaced apart and oppositely facing the first x-axis frame member. There is also a first y-axis frame member and a second y-axis frame member spaced apart from and oppositely facing the first y-axis frame member. A plurality of light sources is disposed on the first x-axis frame member, each such light source for emitting a beam of light substantially parallel to the plane to be received by an opposing sensor disposed on the second x-axis frame member, such that the opposing sensor detects physical interruption of the light by the operator when the operator breaks the plane by accessing the source of components. Each of the light sources and its opposing sensor is assigned to a specific penetration zone representing a segment of the plane such that the interruption of the light beam corresponding to each of the light sources and its opposing sensor occurs when the source behind the penetration zone is accessed by the operator. The size and location of each of the penetration zones is variable or adjustable by changing the number of light sources and opposing sensors assigned to each such penetration zone. A progammable logic control (PLC) means is connected to each sensor for receiving signals therefrom each time one of the light beams is interrupted by the operator's accessing one of the sources. The PLC means compares these signals to information recorded in the PLC means as to the correctness of accessing each source and signals the operator when the operator has made an error in accessing a source.

The invention is also directed to an apparatus for sensing completeness of a human operator's selection of components from sources of components or return of components to sources or loading of inventory into storage areas in a manufacturing, assembly or like operation. There is a frame defining a plane for placement between the operator and the sources of the components such that the operator must break the plane to access the sources. The has an exterior defined by a first x-axis frame member and a second x-axis frame member spaced apart and oppositely facing the first x-axis frame member. There is also a first y-axis frame member and a second y-axis frame member spaced apart from and oppositely facing the first y-axis frame member. A plurality of light sources is disposed on the first x-axis frame member, each such light source for emitting a beam of light substantially parallel to the plane to be received by an opposing sensor disposed on the second x-axis frame member, such that the opposing sensor detects physical interruption of the light by the operator when the operator breaks the plane by accessing a source of components. Each of the light sources and its opposing sensor is assigned to a specific penetration zone representing a segment of the plane such that the interruption of the light beam corresponding to each of the light sources and its opposing sensor occurs when the source behind the penetration zone is accessed by the operator. There are shields on the frame members extending toward or partially into the penetration zones for blocking light reflecting off the frame members. A progammable logic control (PLC) means is connected to each sensor for receiving signals therefrom each time one of the light beams is interrupted by the operator's accessing one of the sources. The PLC means compares these signals to information recorded in the PLC means as to the correctness of accessing each source and signals the operator when the operator has made an error in accessing a source.

Still further, the invention is directed to an apparatus for sensing completeness of a human operator's selection of components from sources of components or return of components to the sources or loading of inventory into storage areas in a manufacturing, assembly or like operation. There is a frame defining a plane for placement between the operator and the sources of the components such that the operator must break the plane to access the sources. The has an exterior defined by a first x-axis frame member and a second x-axis frame member spaced apart and oppositely facing the first x-axis frame member. There is also a first y-axis frame member and a second y-axis frame member spaced apart from and oppositely facing the first y-axis frame member. A plurality of light sources is disposed on the first x-axis frame member, each such light source for emitting a beam of light substantially parallel to the plane to be received by an opposing sensor disposed on the second x-axis frame member, such that the opposing sensor detects physical interruption of the light by the operator when the operator breaks the plane by accessing the source of components. Each of the light sources and its opposing sensor is assigned to a specific penetration zone representing a segment of the plane such that the interruption of the light beam corresponding to each of the light sources and its opposing sensor occurs when the source behind the penetration zone is accessed by the operator. Activation and deactivation of light beams from each light source is sequenced with respect to activation and deactivation of light beams from adjacent light sources, and activation and deactivation of sensors corresponding to each light source is sequenced with respect to activation and deactivation of adjacent sensors. A progammable logic control (PLC) means is connected to each sensor for receiving signals therefrom each time one of the light beams is interrupted by the operator's accessing one of the sources. The PLC means compares these signals to information recorded in the PLC means as to the correctness of accessing each source and signals the operator when the operator has made an error in accessing a source.

Still further, the invention is directed to an apparatus for sensing completeness of a human operator's selection of components from a source of components or return of components to a source in a manufacturing, assembly or like operation. There is a doorway defining a plane for placement between the operator and the source of components such that the operator must break the plane to access the source of the components, which doorway defines a space between a first frame member and a second frame member spaced apart from and oppositely facing the first frame member. There is a light source disposed on the first frame member for emitting a beam of light substantially parallel to the plane to be received by an opposing sensor disposed on the second frame member, such that the opposing sensor detects physical interruption of the light beam by the operator when the operator breaks the plane by accessing the source of components. Light passing from the light source to its opposing sensor passes through a specific penetration zone representing a segment of the plane such that the interruption of the light beam corresponding to the light source and its opposing sensor occurs when the source behind the penetration zone is accessed by the operator. There is a PLC means connected to each sensor for receiving signals therefrom each time the light beam is interrupted by the operator's accessing the source. The PLC means further compares the signal to information recorded in the PLC means as to the correctness of accessing the source and signaling the operator when the operator has made an error in accessing the source.

Other objects and features will be in part apparent and in part pointed out hereinafter.

DETAILED DESCRIPTION OF THE PREFERRED EMBODIMENTS

Figures 1, 2A:
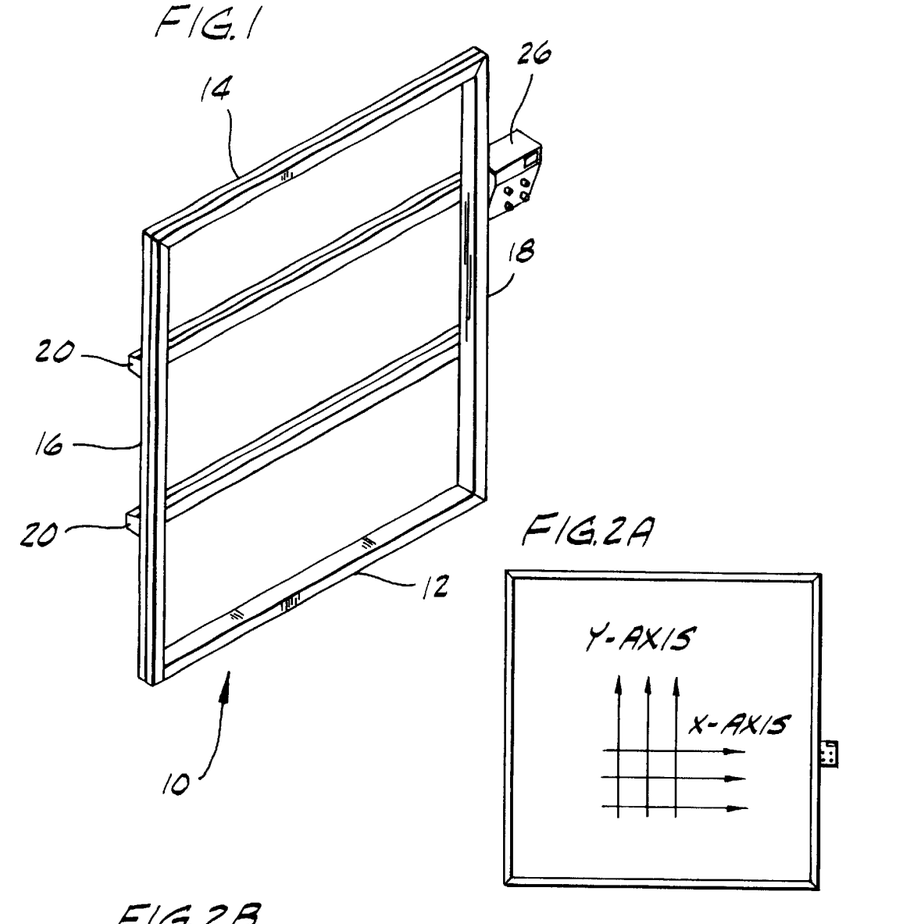
FIG. 1. is a perspective view of a preferred embodiment of the present invention.
FIGS. 2A and 2B are schematics of exemplary sensor frame constructions.
Figure 2B:
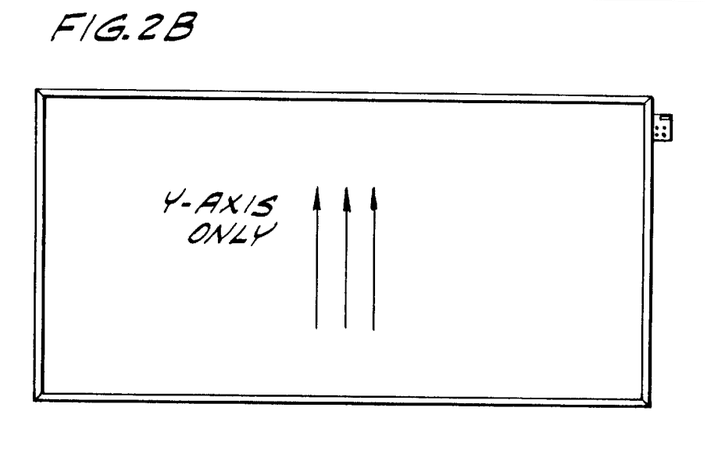
Figure 9:
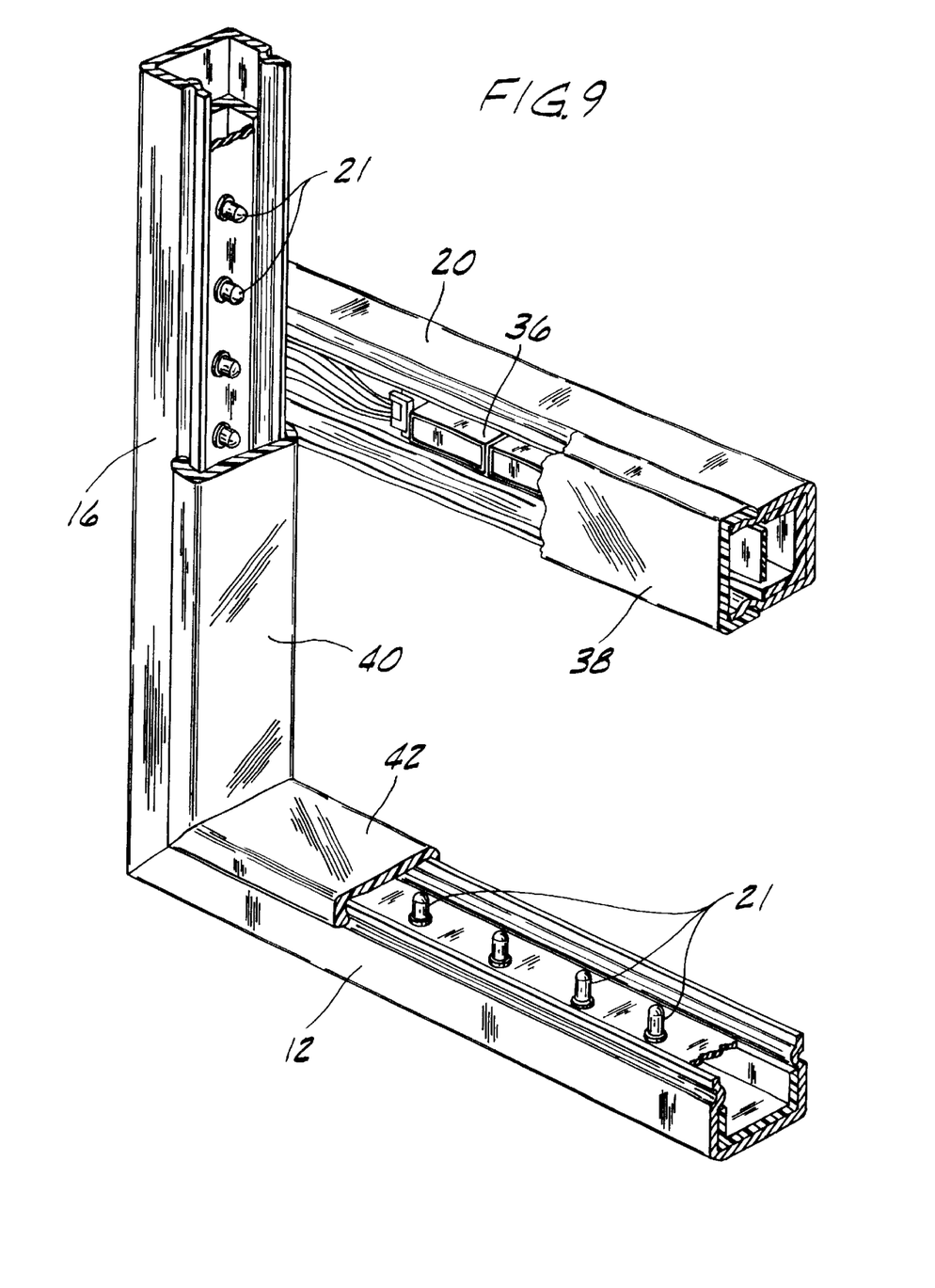
FIG. 9 is a perspective cut-away view of a section of the apparatus.

In the preferred embodiment as shown in FIGS. 1 and 9, the system of the present invention preferably includes a rectangular frame 10 constructed of extruded aluminum components including a first x-axis frame member 12 and a second, parallel, x-axis frame member 14. Second x-axis member 14 is spaced apart from and oppositely facing with respect to the first x-axis frame member 12. There are also a first y-axis frame member 16 and a second, parallel, y-axis frame member 18. Second y-axis frame member 18 is spaced apart from and oppositely facing with respect to the first y-axis frame member 16. These components are combined to form the exterior of frame 10.

The basic frame structure also preferably includes indicator light bars 20 with indicator lights 36 and cover 38 through which light from indicator lights 36 passes. Cover 38 is made from a material similar to that used in personal calculators to enhance the visibility of the numeric display, and thereby enhances the visibility of the indicator lights. The light bars 20 can be moved up and down the y-axis frame members as the apparatus is modified to correspond to penetration zones (described below) of various heights. In particular, the light bars are attached by screws to the frame members which allow the bars to be unfastened, moved up or down, and refastened. Indicator lights 36 on the light bars 20 are preferably movable along the axis of the light bar to correspond to changes in the width and location of corresponding penetration zones, as described below.

Lens covers 40 and 42 (FIG. 9) allow light from emitters 21 to pass through. Similar lens covers cover the opposing sensors. These covers are made of a material which, over the sensors, helps screen out extraneous infrared light from sources other than the emitters and which, over the emitters, enhances the infrared signal emitted therefrom. This cover material is similar in composition and effect to material used at the transmission end of television remote controllers.

Placed at intervals inside the channeled first x-axis member 12 are light emitters (or transmitters or sources) 21 which emit beams of infrared light upwardly in the direction of second x-axis frame member 14. These are not "beams" in the sense of narrowly focused laser beams, but light emitted in the direction of the opposing frame member which fans out as light from most sources does. Housed inside channeled second x-axis frame member 14 are light sensors 22 which sense the beams of light emitted from the light emitters inside first x-axis member 12. For each light emitter there is a corresponding sensor directly opposite thereof for detecting light emitted therefrom. There are therefore a plurality of light emitters disposed on the first x-axis frame member, each of which is for emitting a beam of light substantially parallel to the plane defined by the frame structure itself. This beam of light is to be received by an opposing sensor disposed on the second x-axis frame member, such that the opposing sensor detects physical interruption of the light beam by a human operator when the operator breaks the plane by reaching his hand through the frame. Sensors and emitters other than infrared sensors and emitters can be used so long as they are capable of detecting the insertion of a hand through a defined width such that relative positions along the x and y axis are distinguishable.

There are preferably also a plurality of light emitters disposed also on the first y-axis frame member 16, each such light source for emitting a beam of light substantially parallel to the plane defined by the frame. This light beam is to be received by an opposing sensor among a plurality of sensors disposed on the second y-axis frame member 18. This sensor detects physical interruption of its corresponding light emitter's light beam by the operator when the operator breaks the plane by reaching his hand through the frame.

Figure 6:
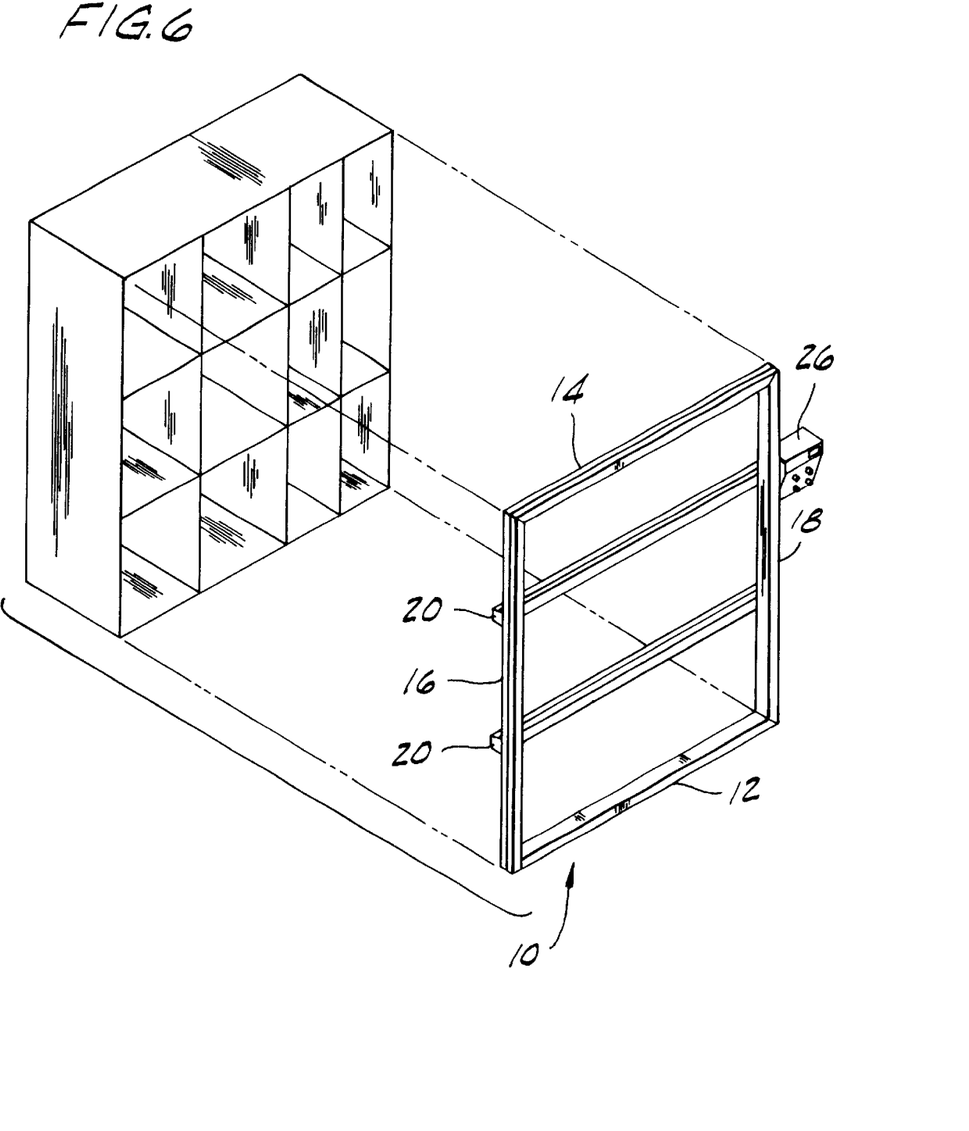
FIG. 6 is a perspective view of the apparatus of the invention illustrating how it is attached to an existing storage rack.

By use of a plurality of x-axis and y-axis light beams and sensors, an x-y matrix light field is established as depicted in FIG. 2A. By comparison of which x-axis sensors and which y-axis sensors detect an interruption in light beam, an x and y coordinate can be assigned to each such interruption in light beams. From this information it can be determined where in the plane defined by the entire frame the operator reached his hand through the frame. Each of the light emitters and its opposing sensor (or groups thereof) defines a specific penetration zone representing a segment of the plane such that the interruption of the light beam corresponding to each of the light emitters and its opposing sensor occurs when the source behind the zone is accessed by the operator. Accordingly, when the frame is attached to a storage rack as indicated in FIG. 6, the x and y coordinate location in the plane corresponds to a particular shelf on the storage rack.

The apparatus is programmable such that when an incorrect shelf is accessed, and/or optionally when a correct shelf is accessed, a signal is given. For example, a buzzer alarm can be sounded to indicate that an incorrect shelf has been accessed. A light can come on when an incorrect shelf has been accessed. A light which is already lit can be turned off when a correct shelf is accessed. In this manner the operator is informed as to whether he or is accessing the source which is intended to be accessed as programmed in advance into the device.

The apparatus is programmable to check for errors as to completeness only, or completeness and sequencing. Accordingly, if the frame is set up to distinguish among six penetration zones with exactly one item to be removed from the shelf behind each zone, in a completeness-only mode it can be programmed to provide an alarm or signal indicating error only in the event more than one item is removed from a particular shelf. In a second completeness and sequencing mode, it can be programmed to provide an error alarm or signal if the items are selected in an order which is different from a preselected order. In variations of either of these modes, the device is programmed to encourage the selection of, for example, three items from a particular location and provide an error alarm or signal if more than three are selected. The device can be used to encourage certain selections by having an indicator light associated with a particular location stay on until the proper number of items from the corresponding location are selected. In an alternative embodiment, green indicator lights are used to encourage selection from a particular location, and red indicator lights are used to discourage such selection from a particular location, or to indicate an error in selection has occurred.

Alternatively, a single indicator light can be used in place of the red and green indicator lights. For example, a single light would be lit to indicate the opening from which the selection is to be made. After the part is removed from the opening 20 that indicator light goes out and the next one in the pretaught sequence is lit, and so forth until the sequence is complete and the indicator light is then lit over the first opening 20 in the sequence so that it can then be started over.

Figure 5:
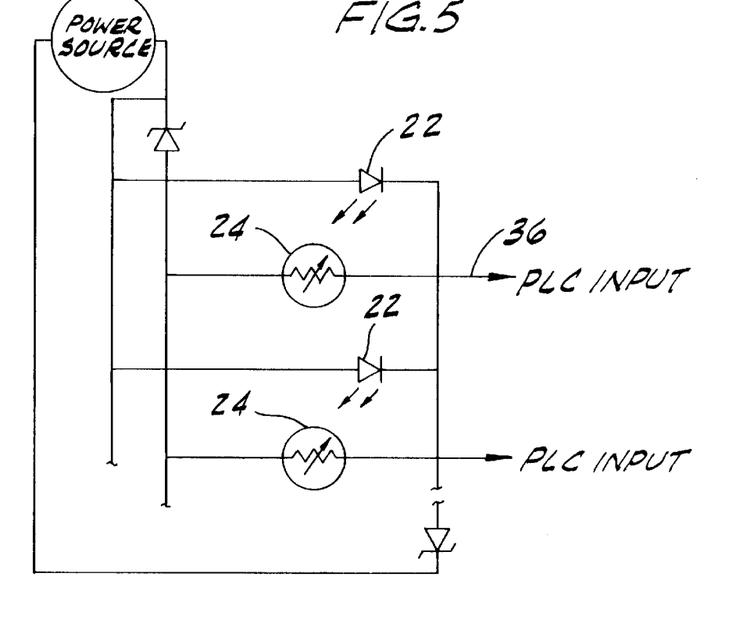
FIG. 5 is a partial schematic of the control circuit illustrating the sensor connections.

FIG. 5 illustrates the circuitry connecting the infrared emitters and sensors with the programmable logic controller (PLC) contained in the box 26 shown in FIG. 1. The illustration in FIG. 5 shows two pairs of emitter 22 and sensor 24, but the same arrangement is used for each of the emitter and sensor pairs in the preferred embodiments. In the preferred embodiment of FIG. 1, the sensor 24 is photoelectric and has a transistor associated with it which, when the beam of light coming from the emitter 22 is broken, is biased so as to operate a relay in the receiver which, in turn, is input to a line 36 connected to an input 37 on the PLC. Since each penetration zone has its own emitter 22 and receiver 24 pair and each is input into a different input terminal on the PLC, the sequence in which each beam is broken can be detected by the PLC. The PLC means is therefore connected to each of the sensors for receiving signals therefrom each time one of the light beams is interrupted by the operator's accessing one of the sources corresponding to a penetration zone. The PLC means compares these signals to recorded information as to which of the sources is intended to be accessed, and informs the operator as to whether the operator is accessing the source which is intended to be accessed. The apparatus card inform the operator that he has accessed a proper source by providing no signal, or by providing a positive signal, such as a bell sound or by lighting an indicator light or by turning off an indicator light. It can inform the operator that he or she has accessed an improper source by providing no signal, or by providing a negative signal, such as an alarm buzzer or bell or by lighting an indicator light.

The PLC used for this purpose in the preferred embodiment is a Z-World-Littlestar Model no. 101-0089 available from Z-World Engineering (Davis, Calif.), but any PLC capable of performing the desired functions is an acceptable substitute.

Computer software is used to program the PLC to monitor group picking operations. In particular, for example, where exactly six different items from six different bins out of 20 bins are to be selected, the lights associated with these six bins are illuminated. As these items are selected (in any order), the associated lights are turned off. Then, when the last of the six items is selected, the cycle starts over by illuminating all six lights, or a different cycle is started by illuminating different lights associated with a different group picking operation. If a bin is accessed which is not to be accessed, an alarm will sound.

Figure 3:
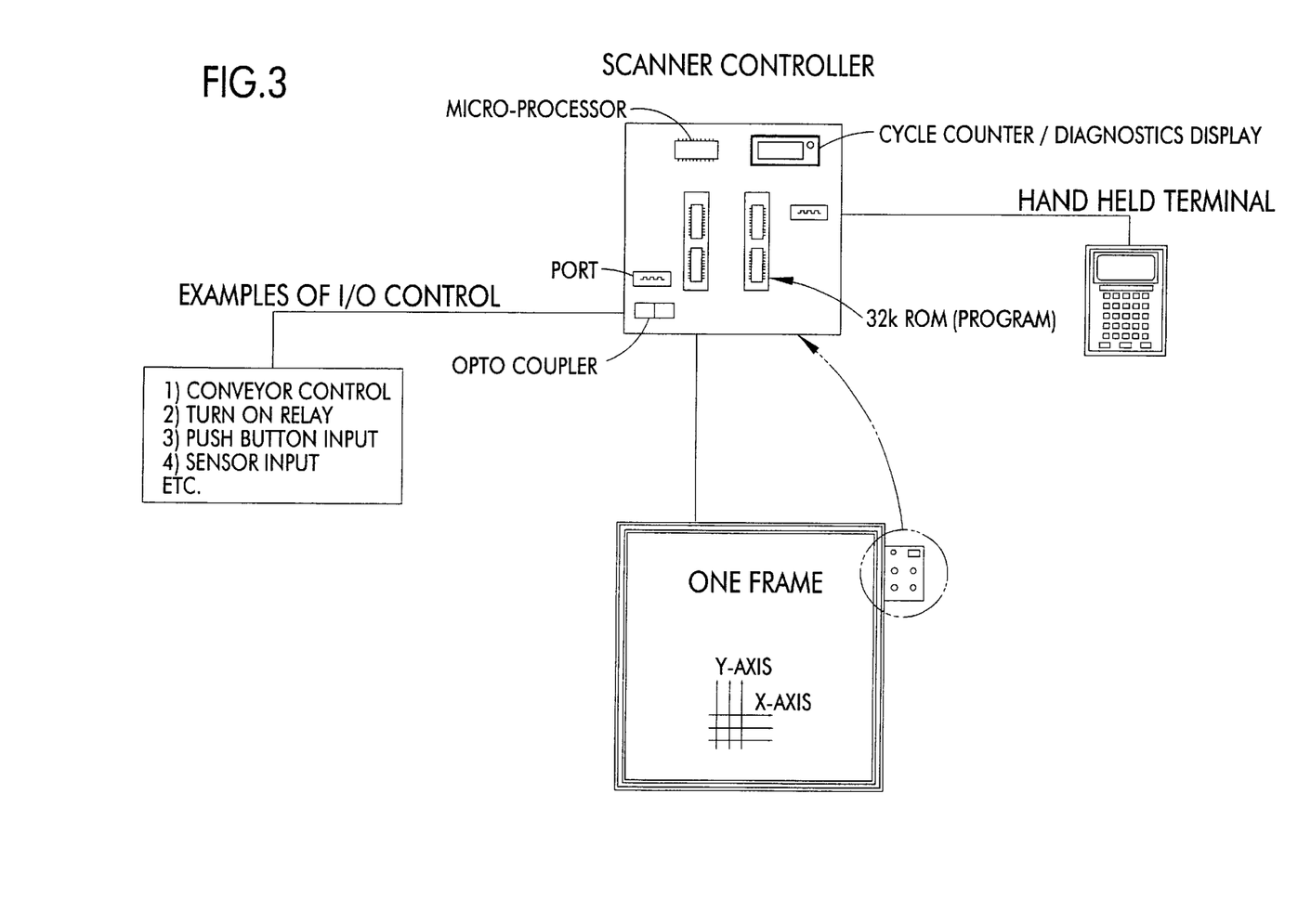
FIG. 3 is schematic of one system control arrangement for the invention.
Figure 4:
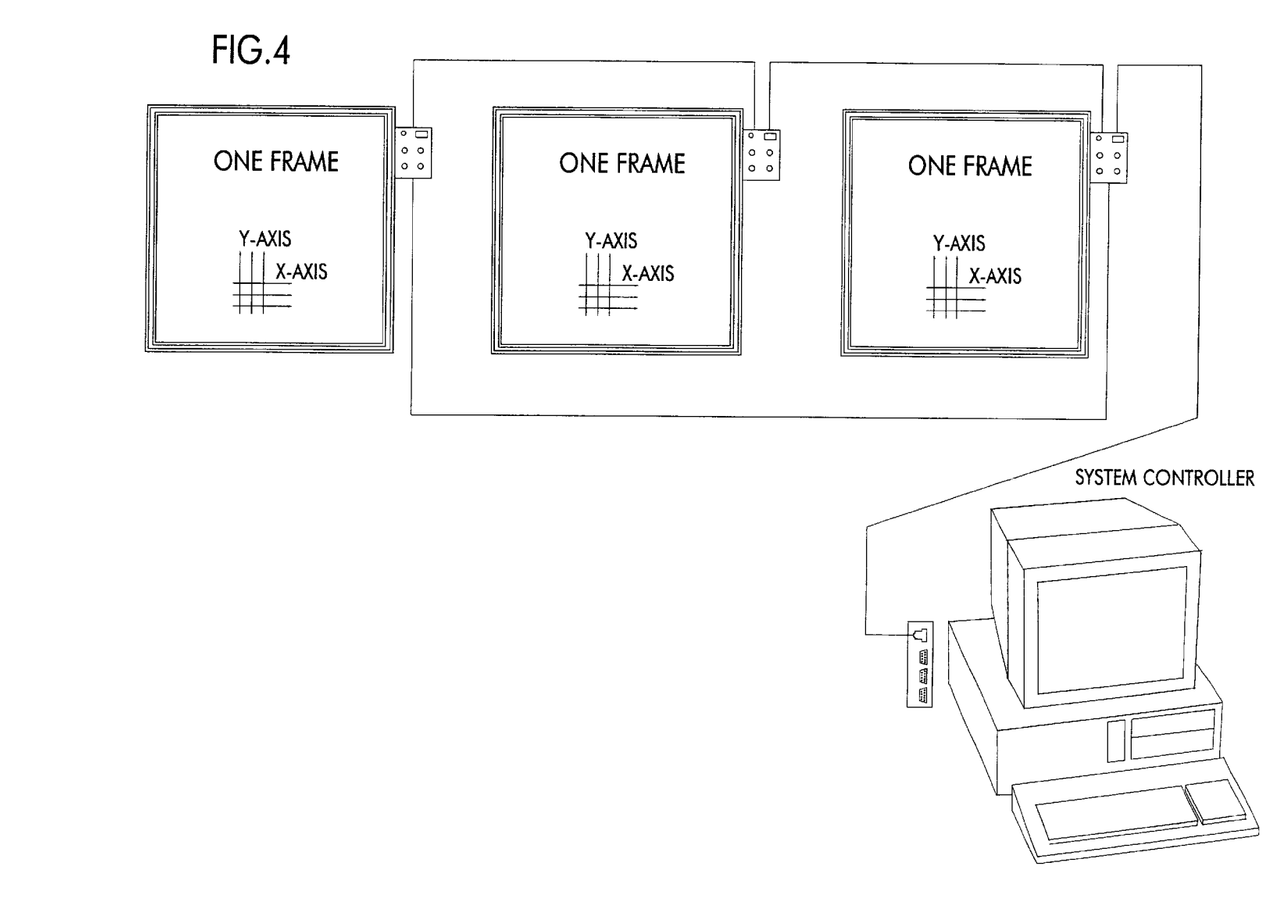
FIG. 4 is schematic of alternative system control arrangement for the invention.

The PLC can be taught a particular sequence or completeness in the manner described in Morgan et al. U.S. Pat. No. 5,414,634, the entire disclosure of which is expressly incorporated by reference. The preferred method to teach the PLC a particular sequence or group completeness, however, is by input from a lap-top computer or a hand held terminal as shown in FIG. 3 or from a personal computer terminal as shown in FIG. 4 using computer software which instructs the PLC. Alternatively, the frame can be configured and instructed as to a sequential or group picking operation directly from a keypad on the PLC controller box.

In a further embodiment, the selection program, whether it requires completeness or a particular sequence, is input using bar-coding technology. For example, when an automobile on an assembly line reaches a location in which certain interior features are to be installed, a bar code specifically corresponding to the custom features for the specific automobile is scanned into the PLC. The error proofing apparatus then directs selection of components specific to this automobile. The next automobile on the line would carry a different bar code which programs the PLC to select a different combination of components.

Flexibility is incorporated into the apparatus because it includes light emitters and corresponding opposing sensors spaced every inch or so along the frame members. Each sensor/emitter pair can be deactivated completely if the corresponding penetration zone does not have a source of interest behind it, or it can be associated with adjacent sensor/emitter pairs so that an enlarged penetration zone is created. In this way, an eight foot wide, y-axis only system is programmable to have 1) eight separate penetration zones which are one foot wide, or 2) four separate penetrations zones which are two feet wide, or 3) five separate penetration zones including one three feet wide zone, one two feet wide zone, and three one foot wide zones. The configuration of the various penetration zones is controlled by a computer software program which instructs the PLC as to the configuration. This same software directs the apparatus as to pick sequence and completeness.

Figure 7:
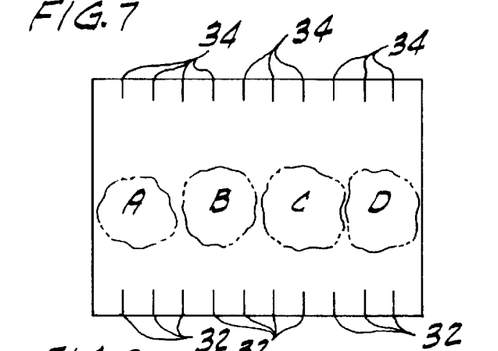
FIG. 7 is a front view schematic of one embodiment of the invention.
Figure 8:
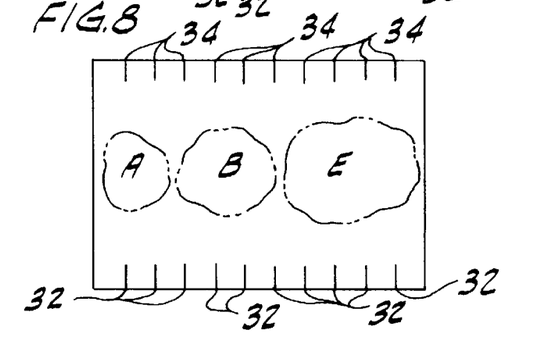
FIG. 8 is a front view schematic of another embodiment of the invention.

Turning to FIGS. 7 and 8, this adjustability in the context of a single-axis system is illustrated schematically. In a first set up shown in FIG. 7 the apparatus is adapted for detecting access through penetration zones A, B, C and D. By reprogramming a four-zone system is modified to a three-zone system. In particular, the PLC accompanying the arrangement in FIG. 7 is programmed so that zones C and D, for example, represent a single penetration zone E, and interruption of the light beams previously corresponding to penetration zones C or D now signals access to a single source occupying the entire area behind one penetration zone represented by E. The frame includes several closely spaced emitter/sensor pairs to provide numerous options with respect to the size and position of the various penetration zones. This represents an improvement in that the apparatus can be used in various conditions with respect to the relative size and relative positions of the sources of components. These features with respect to adjustment of the size of the penetration zone apply likewise to the y-axis emitters in the 2-axis system. The indicator light bars are movable up and down as described above to correspond to an increase or decrease in the height of the penetration zones as determined by the programmed instructions applied to the y-axis emitters.

In a further alternative embodiment, the light emitters in the channeled frame members and their corresponding opposing sensors are movable along the first x-axis frame member 12 and second x-axis frame member 14, such that the specific penetration zone corresponding to each of the light sources and opposing sensors is movable along the x-axis frame members. This same mobility and adjustability applies to the light sources and sensors along the y-axis frame members of the two-axis system of the invention. This facilitates adjustability of the relative positions of the zones, so that one device can be used for a particular storage rack application for a time and then adjusted for use in connection with a storage rack having different geometry.

A further embodiment of the invention has vertical (y-axis) frame members only (no x-axis frame members) which house one or more opposing sensors and emitters. This apparatus is especially advantageous to detect access to a large bin, or even a large storage area by, for example, a forklift, as well as for small components in small storage areas. In such applications the sensitivity and variability provided by a 2-axis system having numerous emitter/sensor pairs is not required. Indicator light or lights are preferably associated with the storage area which is illuminated to advise that a component in the storage area should be accessed and then turned off once the component is accessed. Such lights may be on the frame members themselves. Entry into the storage area in error causes an alarm to sound to inform the operator of the error. This apparatus is an independent apparatus with its own PLC or is used in connection with the remotely positioned four-sided frame system operable by a common PLC with which this apparatus communicates. Alternatively this apparatus has horizontal (x-axis) frame members only (no y-axis frame members) which house one or more opposing sensors and emitters.

The light beams emitted from the light sources are preferably sequenced to emit light every few microseconds so that adjacent light sources are not on at the same time and so that each sensor is deactivated while its corresponding light emitter is off. At time $t_1$, therefore, emitter $e_1$ and sensor $s_1$ are activated and emitter $e_2$ and sensor $s_2$ (as well as all other emitters and sensors) are deactivated. This reduces the incidence of sensor $s_2$ receiving stray signals from emitter $e_1$ or other emitters. At time $t_2$, emitter $e_1$ and sensor $s_1$ are deactivated and emitter $e_2$ and sensor $s_2$ are activated. This reduces the incidence of sensor $s_1$ receiving stray signals from emitter $e_2$. The same principles are applied to all pairs $e_3/s_3$, $e_4/s_4$, and so on such that only one pair of emitter/sensor is on at a time. The apparatus therefore scans across the frame interior back and forth with the x-axis pairs and up and down with the y-axis pairs. In this manner activation and deactivation of light beams from each light source is sequenced with respect to activation and deactivation of light beams from adjacent light sources, and activation and deactivation of sensors corresponding to each light source is sequenced with respect to activation and deactivation of adjacent sensors.

Figure 10:
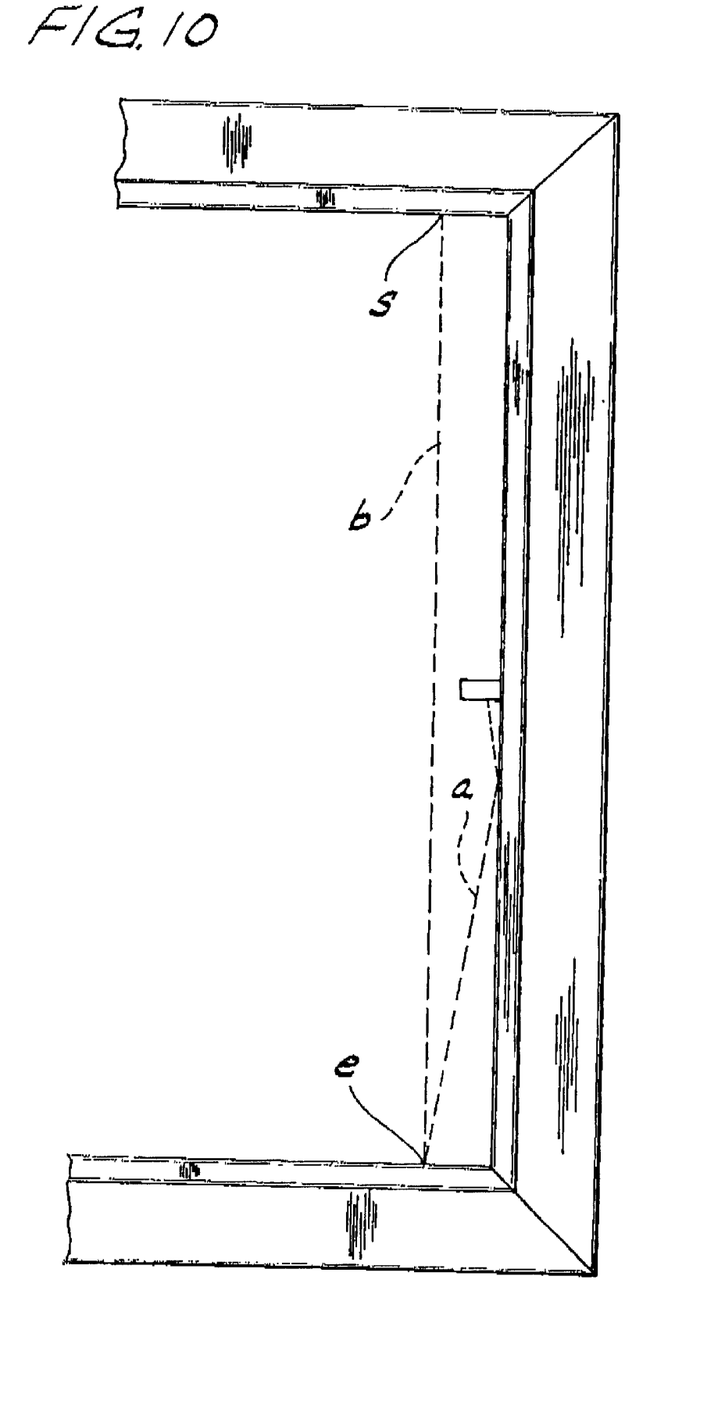
FIG. 10 is a front view schematic of a section of the apparatus.

The light emitters and sensors are preferably shielded by attachment of a gate or shield on the respective lens covers to reduce the incidence of false signals being received by the sensors due to reflection of light around off of the lens covers. Turning to FIG. 10 there is shown schematically a frame portion having a sensor on the upper frame member and an emitter on the lower frame member. On the vertical frame member disposed between the upper and lower frame members is the shield of the invention. One such shield is preferably disposed on each frame member approximately at the center thereof and extends partially into or at least toward the frame interior penetration zones. These shields are preferably about ¼ inch wide, ½ inch high, and 1¼ inch long and are fastened as by screws or the like to the lens covers. These shields are preferably painted black or another relatively non-reflective color. The function of the particular shield shown is to block light which travels from the lower frame emitter to the vertical frame member lens cover and reflects back to the upper frame sensor. Without such a shield there is a tendency for this reflected light to in effect reflect around the penetration zone. As such, the sensor can continue to detect light even though there is a hand in the direct line between the sensor and the emitter. This provides a false signal to the effect that the penetration zone has not been accessed, when in fact it is being accessed. The shield as shown blocks light from emitter "e" along the path shown as "a" while allowing light along path "b" to continue to the sensor "s." The shield extends in the direction toward the penetration zone to be monitored by light along path "b." Because this disadvantageous reflective effect is greater over greater distance, this shielding is especially advantageous where the sensors are an appreciable distance, such as eight feet, away from their corresponding emitters.

Although the invention has been described in connection with the selection of items in a manufacturing or kit assembling type operation, it is also designed for use in a loading mode to load inventory into a storage rack system or the like. For example, an operator charged with loading a storage rack with inventory components scans a bar code corresponding to a particular inventory component into the apparatus. The apparatus is programmed to understand that, for example, nine of these components are to be loaded. This number may correspond exactly to the number of such components removed from the rack over a period of time or may be independent thereof. The indicator light over the particular location on the storage rack remains lit until the proper number of components is stored and sounds an alarm if too many components are stored by the operator.

The invention is further designed for use to monitor and error proof with respect to surgical operations and with respect to the return of inventory. For example, in the case where a particular surgical operation will require seven gauzes, the invention is used to assemble the surgical kit to include exactly seven gauzes. Furthermore, when a surgeon uses six gauzes or surgical instruments in a particular operation, this apparatus can be used to ensure that all six items are returned, thus further ensuring that no instruments or gauzes are left inside the surgeon's patient.

Although shown in the figures to be used in connection with storage rack type facility, the invention is suitable for placement in front of a series of bins of the type shown in Morgan et al. U.S. Pat. No. 5,414,634. The invention is also suitable for error proofing in large scale operations where each penetration zone is actually a large doorway or the like which is accessed by a forklift or the like, as in the case of the vertical two-axis system described above.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for sensing completeness of a human operator's selection of components from sources of said components in a manufacturing, or assembly operation, comprising:

a frame;

a plurality of light sources supported by said frame for emitting beams of light defining a plane for placement between the operator and the sources of said components such that the operator must break said plane to access the sources of said components, at least one sensor associated with each light source and supported by said frame such that said sensor detects physical interruption of said light beam by the operator when the operator breaks said plane by accessing said source of components;

wherein each of said light sources and its associated at least one sensor is assigned to a specific penetration zone representing a segment of said plane such that the interruption of the light beam corresponding to each of said light sources and its associated at least one sensor occurs when the source behind said penetration zone is accessed by the operator;

wherein the size of each of said penetration zones is adjustable; and a programmable logic controller (PLC) connected to each said sensor for receiving signals therefrom each time one of said light beams is interrupted by the operator's accessing one of said sources, said PLC further comparing said signals to information recorded in the PLC as to the correctness of accessing each source and signaling the operator when the operator has made an error in accessing a source.

2. The apparatus of claim 1 further comprising a plurality of indicator lights each of which is associated with one of said penetration zones.

3. The apparatus of claim 2 wherein said indicator lights are disposed on at least one indicator light bar above said penetration zones.

4. The apparatus of claim 1 wherein activation and deactivation of light beams from each light source is sequenced with respect to activation and deactivation of light beams from adjacent light sources, and wherein activation and deactivation of sensors corresponding to each light source is sequenced with respect to activation and deactivation of adjacent sensors.

5. The apparatus of claim 1 wherein the size of each of said penetration zones is adjustable by changing the number of light sources assigned to each such penetration zone.

6. The apparatus of claim 1 wherein the size of each of said penetration zones is adjustable by changing the number of sensors assigned to each such penetration zone.

7. The apparatus of claim 1 wherein the size of each of said penetration zones is adjustable by changing the number of light sources and sensors assigned to each such penetration zone.

8. Apparatus for sensing completeness of a human operator's selection of components from a source of said components or return of components to said source in a manufacturing, or assembly operation, comprising:

a doorway defining a plane for placement between the operator and the source of said components such that the operator must break said plane to access the source of said components, said doorway being a space between a first frame member and a second frame member spaced apart from and oppositely facing the first frame member;

a light source disposed on the first frame member for emitting a beam of light substantially parallel to the plane to be received by an opposing sensor disposed on the second frame member, such that said opposing sensor detects physical interruption of said light beam by the operator when the operator breaks said plane by accessing said source of components;

wherein light passing from said light source to its opposing sensor passes through a specific penetration zone representing a segment of said plane such that the interruption of the light beam corresponding to said light source and its opposing sensor occurs when the source behind said penetration zone is accessed by the operator; and a programmable logic controller (PLC) connected to each said sensor for receiving signals therefrom each time said light beam is interrupted by the operator's accessing said source, said PLC further comparing said signal to information recorded in the PLC as to the correctness of accessing the source and signaling the operator when the operator has made an error in accessing the source.

9. The apparatus of claim 8 comprising a plurality of pairs of light sources and opposing sensors.

* * * * *